United States Patent [19]

Wall et al.

[11] Patent Number: 4,474,406
[45] Date of Patent: Oct. 2, 1984

[54] VEHICLE SEAT, PARTICULARLY FOR AIRPLANES AND BUSES

[76] Inventors: Helmut Wall, Plochinger Strasse 49, D-7312 Kirchheim/Teck; Karl Schmidhuber, Liebermannstrasse 1, D-7440 Nürtingen; Gerhard Kreiser, Silcherstrasse 20, D-7312 Kirchheim/Teck; Bernd Speidel, Daimlerweg 3, D-7315 Weilheim/Teck, all of Fed. Rep. of Germany

[21] Appl. No.: 381,713

[22] Filed: May 24, 1982

[30] Foreign Application Priority Data

Jun. 4, 1981 [DE] Fed. Rep. of Germany ....... 3122299

[51] Int. Cl.³ .............................................. A47B 83/02
[52] U.S. Cl. ..................................... 297/146; 16/374; 16/386
[58] Field of Search ............... 297/165, 146, 250, 257; 244/122 R, 118.6; 16/374, 386, 380, 381

[56] References Cited

U.S. PATENT DOCUMENTS

| | | | |
|---|---|---|---|
| 1,555,603 | 9/1925 | Overing, Jr. .......................... | 16/386 |
| 3,009,737 | 11/1961 | Burnett. | |
| 3,795,422 | 3/1974 | Robinson et al. .................... | 297/146 |
| 3,877,747 | 4/1975 | Brennan et al. ..................... | 297/146 |
| 4,159,071 | 6/1979 | Roca .................... | 297/146 |
| 4,394,047 | 7/1983 | Brunelle ......................... | 244/122 R |

FOREIGN PATENT DOCUMENTS

| | | |
|---|---|---|
| 3019040 | 12/1980 | Fed. Rep. of Germany. |
| 3019041 | 12/1980 | Fed. Rep. of Germany. |
| 2286938 | 4/1976 | France ................................. 16/386 |

Primary Examiner—William E. Lyddane
Assistant Examiner—Mark W. Binder
Attorney, Agent, or Firm—Wigman & Cohen

[57] ABSTRACT

The present invention relates to a vehicle seat, particularly for airplanes and buses. The seat has a support with an adjacent divider having a bore therethrough. A hollow pin has an end section detachably engaged in the bore of the adjacent seat divider. A back rest is mounted at one of its sides on the hollow pin. A connecting body is arranged in the bore of the seat divider and has a longitudinally threaded bore therethrough. A threaded bolt passes through the hollow pin and engages with the threaded bore through the connecting body. A folding table support is mounted on the threaded bolt for pivoting movement thereabout. A stop projects from the hollow pin and limits the pivot movement of the folding table support.

9 Claims, 2 Drawing Figures

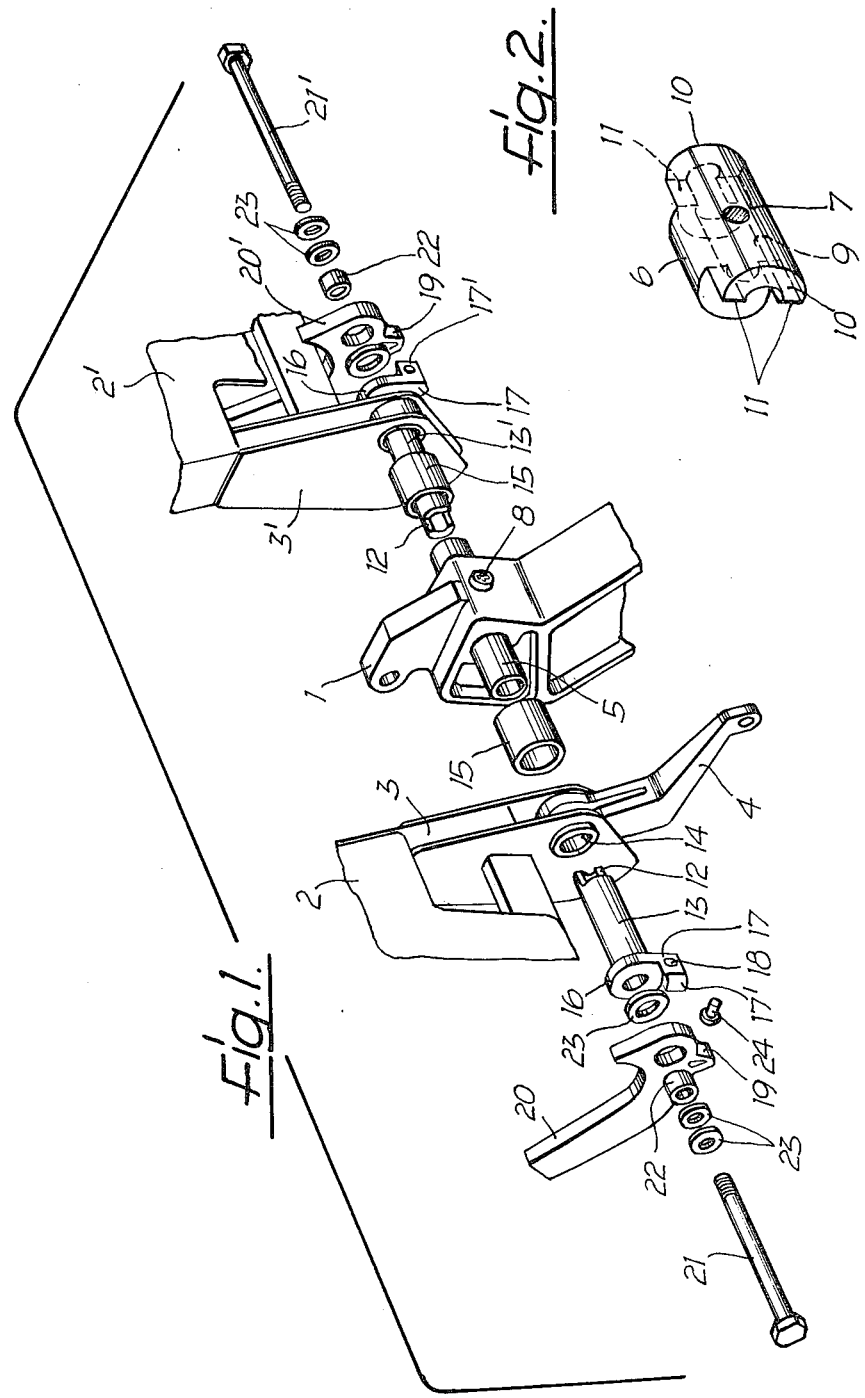

VEHICLE SEAT, PARTICULARLY FOR AIRPLANES AND BUSES

BACKGROUND OF THE INVENTION

1. Field of the Invention

The invention relates to a vehicle seat, particularly for airplanes and buses. The seat frame has two longitudinal beams on which the back rest and respective supports for a folding table arranged on the back side of the seat are hinged.

2. Description of the Prior Art

In known seats of this type designed as air passenger seats, the installation and removal of the back rest and folding table is difficult because, on the side of the seat adjoining the next seat in the row of seats, the back rests and the folding tables of the two adjacent seats are connected to the seat divider lying between the two seats and forming the longitudinal beam by means of a common threaded bolt. The installation and removal of the back rest and folding table, therefore, cannot take place independently of the neighboring seat.

OBJECTS AND SUMMARY OF THE INVENTION

The basic object of the invention is to create a seat which, while maintaining the design principle of connecting the back rest and the folding table with the longitudinal beam, makes possible installation and removal of the back rest and folding table without having to simultaneously install or remove the back rest and the folding table of an adjacent seat.

Since the manufacture of the pivotable connection of the back rest and the folding table requires only that the end of the hollow pin formed as a coupling half be brought into engagement with the other coupling half provided on the connecting body and that this engagement be secured with the aid of the threaded bolt, which threaded bolt is screwed into the threaded bore of the connecting body from the side of the coupling half, the installation and removal does not affect an adjacent seat, even when the back rest and folding table are to be hinged to opposite sides of the same longitudinal beam. A design change in the seat renders this connection of the back rest and folding table to the longitudinal beam unnecessary because, as with the known seat, the back rest and the folding table are hinged to the same location on the longitudinal beam on one side thereof.

A further advantage of the solution according to the invention is to be seen in the fact that both the connecting body and the hollow pin are economical structural elements to produce.

With regard to possibilities for economical manufacture and with regard to the torque to be transferred from the hollow pin to the connecting body, it is advantageous to construct the coupling formed by the two coupling halves at the hollow pin or connecting body as a claw coupling. This is especially true when the two coupling halves are formed by respective claws each extending over half of the circumference.

In a preferred embodiment, the surface of each claw serving to provide abutment for the other claw is formed as an angled plane relative to the longitudinal axis of the hollow pin or connecting body. This has the result that the axial pressure with which the hollow pin is pressed against the connecting body by the threaded bolt causes a radial spreading of the two coupling halves, thus achieving a play-free seating of the two coupling halves in the bore of the longitudinal beam and an additional frictional connection between the hollow pin and the bore in which it is located. This is particularly advantageous when the hollow pin is a cylindrical body.

Preferably, the threaded bore of the connection body is a through bore. If the connecting body also has a second coupling for a second form-fitting coupling on the end opposite the first coupling half, as is the case in a preferred embodiment, then the hollow pin for the pivotable connection of the back rest and the folding table of the adjacent seat can be introduced into the bore of the longitudinal beam from the other side and can be coupled with the connecting body so as to be free of rotation and free of axial movement. In order to be able to use identical hollow pins on both sides, the second coupling half is preferably formed like the coupling half provided on the other end of the connecting body.

The connecting body does not have to be a multiple-sided element which is arranged so as not to rotate in its correspondingly formed bore in the longitudinal beam. To the contrary, the connecting body may be an element turned on a lathe, i.e., a cylinder, provided with a radial bore in which a screw engages with and connects said cylinder with the longitudinal beam so as not to rotate and to be free of axial movement.

Even when the hollow pin is a turned element which is advantageous for manufacturing reasons, the stop for the supports of the folding table can have an arm which is formed in one piece with the hollow pin and projects radially therefrom and is provided with an axial projection. with this construction, it is particularly advantageous that the radial projection which projects into the pivot plane of the support is provided with a threaded through bore into which a screw is threaded which forms a stop surface for the supports. The position of the supports can then be adjusted in a simple manner.

BRIEF DESCRIPTION OF THE DRAWINGS

The invention is described in greater detail below with the aid of an exemplary embodiment illustrated in the drawing. Shown are:

FIG. 1—an exploded view of the rear end of the one longitudinal beam of the exemplary embodiment with the elements which serve to provide the pivotable connection of a back rest and a folding table arranged therebehind with the longitudinal beam;

FIG. 2—an enlarged perspective view of the connecting body arranged in the bore of the longitudinal beam.

DETAILED DESCRIPTION OF THE PREFERRED EMBODIMENT

The exemplary embodiment of the seat according to the invention is an air passenger seat which, in a known manner, has a seat frame supported near its front and rear cross beams, each of which is formed by a pipe on feet. Of the two longitudinal beams of the seat support which form a frame, at least one is formed by a so-called seat divider 1, of which the rear section is shown in FIG. 1 projecting upwardly at an angle past the rear cross beam of the seat support. The other longitudinal beam of the seat support is not shown in FIG. 1 since, in the exemplary embodiment, it is also formed by a seat divider having the same form as the seat divider 1.

The lower end of the back rest 2 associated with the seat, of which back rest 2 basically only the lower end of the one side beam 3 of its upholstery support is seen in FIG. 1, engages between the seat dividers. This side beam 3, beyond the lower end of which a pivot lever 4 extends and which is rigidly connected therewith, is pivotably connected with the rear end of the adjacent seat divider 1 in order to be able to alter the angle of inclination of the back rest 2.

For this pivotable mounting of the back rest 2, the seat divider 1 is provided with a through bore in which is arranged a mounting sleeve 5 which projects outwardly on both sides. The projection of the mounting sleeve 5 can be eliminated when, as opposed to the exemplary embodiment, the seat divider 1 does not also serve to provide a pivotable mounting for the back rest 2' of a second, immediately adjoining seat. The second seat divider (not shown) on the other side of the seat is formed in the same manner. Its mounting sleeve is flush with the mounting sleeve 5 and defines a pivot axis for the back rest 2 lying parallel to the cross beams of the seat support.

A connecting body 6 is placed inside the mounting sleeve 5 which, as shown in FIG. 2, has a cylindrical center, the outer diameter of which is adapted to the inner diameter of the mounting sleeve 5. The connecting body 6, arranged in the center of the seat divider 1, has, at a point at half its length, a radial threaded bore 7, with which a bore which penetrates the seat divider 1 and the mounting sleeve 5 are aligned and in which a screw 8 can be placed. This screw 8 is threaded into the threaded bore 7 to connect the connecting body 6 with the seat divider 1 so as to prevent rotation and axial movement.

The connecting body 6, which includes a central, threaded through bore 9 extending over the entire length of its center section, forms at each end one half of a claw coupling. The two identically formed end sections of the connecting body 6 are therefore formed by respective claws 10 which extend over half of the circumference. The flat stop surfaces 11 of each claw 10 serve to provide the abutment surface for a correspondingly formed claw 12 on one end of a hollow pin 13 and form an angled plane which is inclined toward the longitudinal axis of the connecting body 6, so that the claw 10 and the claw 12 can be pressed slightly radially outward when the two claws 10 and 12 move toward each other in an axial direction. This wedge effect eliminates any radial play.

The hollow pin 13 serves as a mounting pin for the side beam 3 of the back rest 2. It passes through a bore 14 on the lower end of the side beam 2 and is introduced into the mounting sleeve 5 until its claw 12 is in engagement with the claw 10 of the connecting body 6. A spacing sleeve 15, which is pushed onto the projecting section of the mounting sleeve 5, maintains the required distance of the side beam 3 from the seat divider 1 in the exemplary embodiment.

The hollow pin 13, on the end opposite the claw 12, has an annular collar 16 formed in one piece therewith as well as a radial arm 17 formed in one piece with said collar 16 and which is provided with a radial projection 17' also formed in one piece therewith. The projection 17', which projects over the side of the arm 17 directed away from the hollow pin 13, is provided with a threaded through bore 18 and is directed toward a downwardly projecting projection 19 on a support 20. This support 20 is pivotably mounted on a threaded bolt 21 next to the side beam 3 on the side opposite the seat divider 1. This threaded bolt 21 passes through the central bore of the hollow pin 13 and is screwed into the threaded through bore 9 of the connecting body 6. In the exemplary embodiment, the support 20 is not mounted directly on the threaded bolt 21, but on a mounting sleeve 22, through which the threaded bolt 21 passes. Intermediate discs 23 are arranged between the lower end of the support 20 on one side and the annular collar 16 and the head of the threaded bolt 21 on the other side. The head of an adjusting screw 24, screwed into the threaded bore 18, forms the stop for the projection 19 and makes possible an adjustment of the end position of the support 20.

To install the back rest 2 and the folding table arranged therebehind, one need only insert the hollow pin 13 through the bore 14 of the side beam 3 and into the mounting sleeve 15 until it contacts the connecting body 6. Then, one inserts the threaded bolt 21 through the mounting sleeve 22 of the support 20 and the central longitudinal bore in the hollow pin 13 and screws the bolt 21 into the threaded through bore 9 of the connecting body 6. Since the claw 12 of the hollow pin 13 can only be brought into engagement with the claw 10 of the connecting body 6 in a single angular position, installation automatically results in the correct angular position of the radial arm 17 and therewith the stop of the projection 19 of the support 20. The installation can thus take place independently of the adjacent seat. The same holds true for removal of the back rest 2 and/or the folding table (not shown).

The back rest 2' of the adjacent seat as well as its folding table, as shown in FIG. 1, are hinged to the seat divider 1 in a corresponding manner. Since the identically formed hollow pin 13', which forms the mounting pin for the side beam 3' of the back rest 2', is inserted into the mounting sleeve 5 from the opposite side and can be coupled with the connecting body 6. Furthermore, the introduction and removal of the associated threaded bolt 21', which is formed like the threaded bolt 21 and forms the mounting pin for the support 20' of the folding table arranged behind the back rest 2', does not influence the mounting of the side beam 3 and the support 20 since this threaded bolt 21' can be screwed into or out of the threaded through bore 9 of the connecting body 6 independently of the threaded bolt 21.

The foregoing preferred embodiment is considered as illustrative only. Numerous other modifications and changes will readily occur to those skilled in the pertinent art.

We claim:

1. A vehicle seat, particularly for airplanes and buses, comprising:
   a seat support including at least one seat divider with a bore therethrough;
   a hollow pin having an end section detachably engaged in the bore of the seat divider;
   a back rest mounted at one of its sides on the hollow pin;
   a connecting body, arranged in the bore of the seat divider, having a longitudinally threaded bore therethrough;
   a threaded bolt means for passing through the hollow pin and for engaging with the threaded bore through the connecting body;
   a folding table support means, mounted on the threaded bolt means, for pivotably moving thereabout; and a stop means, projected from the hollow pin, for limiting the pivot movement of the folding table support means, wherein said end section of the hollow pin and the connecting body together form a coupling.

2. The seat according to claim 1, wherein:
said end section of the hollow pin and a first section of the connecting body together form a claw coupling.

3. The seat according to claim 2, wherein:
said end section of the hollow pin and said first end section of the connecting body separately extend over about half the circumference therearound.

4. The seat according to claim 2, wherein:
a surface of the end section of the hollow pin and a surface of the first end section of the connecting body abut each other and form a plane angled relative to a longitudinal axis through the hollow pin and through the threaded bore in the connecting body.

5. The seat according to claim 2, wherein:
said connecting body has a second end section formed as a coupling half on its opposite end from the first end section.

6. The seat according to claim 1, wherein:
said connecting body has a cylinder-like shape and has a radial bore passing through one side wall thereof to the longitudinal axis of the threaded bore.

7. The seat according to claim 6, further comprising:
screw means, engaged in said radial bore, for fastening the connecting body inside the seat divider so that rotation and axial movement is prevented.

8. The seat according to claim 1, wherein:
said stop means includes an arm formed in one piece with the hollow pin on which arm there is provided an axial projection having a bore therethrough.

9. The seat according to claim 8, further comprising:
screw means, threaded into the bore through the axial projection, for forming a stop surface against the pivot movement of the folding table support means.

* * * * *